(12) United States Patent
Groeger et al.

(10) Patent No.: US 10,699,505 B2
(45) Date of Patent: Jun. 30, 2020

(54) MARKING FOR AUTHENTICATION AND ACCESS

(71) Applicant: Tiburon Lockers Inc., Rockleigh, NJ (US)

(72) Inventors: Brian Groeger, Levittown, PA (US); Jared Lowenthal, Norwood, NJ (US)

(73) Assignee: TIBURON LOCKERS INC., Rockleigh, NJ (US)

( * ) Notice: Subject to any disclaimer, the term of this patent is extended or adjusted under 35 U.S.C. 154(b) by 525 days.

(21) Appl. No.: 15/228,367

(22) Filed: Aug. 4, 2016

(65) Prior Publication Data

US 2018/0040181 A1    Feb. 8, 2018

(51) Int. Cl.
| | | |
|---|---|---|
| G06F 15/02 | (2006.01) | |
| G07C 9/30 | (2020.01) | |
| G06Q 10/10 | (2012.01) | |
| G06Q 30/06 | (2012.01) | |
| G06Q 20/40 | (2012.01) | |
| G07C 9/00 | (2020.01) | |
| G07F 17/12 | (2006.01) | |
| G07F 17/00 | (2006.01) | |
| G06Q 20/12 | (2012.01) | |

(52) U.S. Cl.
CPC .......... *G07C 9/30* (2020.01); *G06Q 10/1091* (2013.01); *G06Q 20/127* (2013.01); *G06Q 20/4014* (2013.01); *G06Q 20/40145* (2013.01); *G06Q 30/0645* (2013.01); *G07C 9/00912* (2013.01); *G07F 17/0021* (2013.01); *G07F 17/12* (2013.01)

(58) Field of Classification Search
CPC .......... G07C 9/00126; G06Q 10/1091; G06Q 20/18; G06Q 20/4014
USPC .......................................................... 705/32
See application file for complete search history.

(56) References Cited

U.S. PATENT DOCUMENTS

| | | | | |
|---|---|---|---|---|
| 8,107,103 | B2* | 1/2012 | Nuggehalli | G06K 15/02 358/1.14 |
| 8,184,310 | B2* | 5/2012 | Nemoto | G06F 21/6218 358/1.14 |
| 2002/0133725 | A1* | 9/2002 | Roy | G07C 9/37 726/5 |
| 2003/0132830 | A1* | 7/2003 | Dow | G07C 9/27 340/5.22 |

\* cited by examiner

*Primary Examiner* — Rokib Masud
(74) *Attorney, Agent, or Firm* — Kim IP Law Group PLLC

(57) ABSTRACT

An authentication system for managing access to an access-restricted system is provided. The system includes a user interface panel for receiving a request for access rights from a user. A processing device is also provided for assigning the access rights to the user and storing them in a database. An ink deposition station coupled to the processing device is operable to print access credentials on an authentication object in accordance with the access rights assigned to the user. The user may then gain access to at least a portion of the access-restricted system by interfacing with a credentials reader. The reader scans the access credentials from the authentication object and transmits the credentials to the processing device, which grants access to the access-restricted system upon authentication of the access credentials.

17 Claims, 10 Drawing Sheets

MARKING FOR AUTHENTICATION AND ACCESS

FIELD OF INVENTION

The present invention relates to authentication systems for authenticating access privileges and, in particular, authentication systems for managing access rights associated with an access-restricted system.

BACKGROUND OF THE INVENTION

Authentication systems for providing users with access privileges are well known. Such systems typically provide a means by which authorized users may authenticate access privileges for gaining access to at least a portion of an access-restricted system, such as an access-restricted venue, room, compartment, computer, area, etc. For example, manufactures of electronic locker systems typically provide a means by which users can authenticate access to rented compartments. Such systems typically include a bank of compartments and a kiosk that allows a customer to rent and access one or more of the compartments using credit cards, cash or other forms of payment. After completing the rental process, the user secures his/her personal belongings in the rented compartment. To access the compartment, the user typically enters a personal identification code (e.g., a PIN or password) into the kiosk, which then opens the rented compartment electronically. An example of an electronic locker system employing PINs may be found in co-owned U.S. patent application Ser. No. 15/084,298, the entire contents of which are expressly incorporated herein by reference.

While PINs and passwords provide means to authenticate access privileges for electronic lockers and other access-restricted systems, they may suffer from security issues. For example, it is possible for a person to obtain the PIN of another user by observing him/her entering the PIN into a kiosk or other device to gain access to an access-restricted system. The person may then use the PIN at a later time to gain unauthorized access to the system. It is also possible for a user to give his/her PIN to another user, thereby allowing another person to continue use of the access-restricted system. Such PIN transfers not only allow unauthorized access, but may also lead to reduced profits for an establishment at which the authentication system is installed. For example, with respect to electronic locker systems, transfer of PINs and passwords may prevent an establishment from earning rental fees from persons who would otherwise have paid for a rental.

Some companies have developed authentication means that seek to address these issues. For example, some authentication systems have been developed that use biometric scanners, such as fingerprint and eyeball recognition scanners, for authenticating access to an access-restricted system. Other companies have developed authentication systems that use wristbands with imprinted barcodes that are scanned by a reader in order to gain access. While these authentication systems provide better security and reduce the likelihood of transfer of access rights, they require very expensive hardware and software. They also typically require the replacement of certain disposable or consumable goods (such as wristbands), which is time consuming and costly.

SUMMARY OF THE INVENTION

Embodiments of the present invention solve these and other disadvantages of the prior art by providing an authentication system for managing access to an access-restricted system using an authentication object with access credentials printed thereon. To gain access, a user first requests access rights from a user interface panel, such as a kiosk. Once rights are obtained, the user places an authentication object within an ink deposition station, which proceeds to print access credentials on the authentication object in accordance with the user's access rights. The user may then access the access-restricted system by interfacing with a credentials reader, which reads the access credentials from the authentication object and grants access upon authentication of the credentials.

In certain embodiments, invisible inks or dyes are used to print the access credentials on the authentication object. Use of invisible inks or dyes reduces the likelihood that unauthorized persons can obtain the access credentials surreptitiously.

Various embodiments of the present invention also permit the access credentials to be printed on a variety of different authentication objects, including authentication objects supplied by the user. This eliminates the need for and expense associated with consumable authentication objects supplied by the authentication system itself (such as wristbands, RFID chips, etc.), as well as the hardware and software required to dispense such consumables. With respect to certain embodiments, an authentication object may also include a body part of the user, such as the back of a hand or wrist of the user. With respect to these embodiments, and when using invisible inks or dyes, transfer of authentication credentials to an unauthorized user may be greatly reduced, if not eliminated altogether. Printing inks and dyes on the body part of a user may also permit operators at certain venues to improve patron security, for example, by providing a means by which operators can scan the code of lost children to identify and ultimately locate their parents.

DETAILED DESCRIPTION

Figure 1:
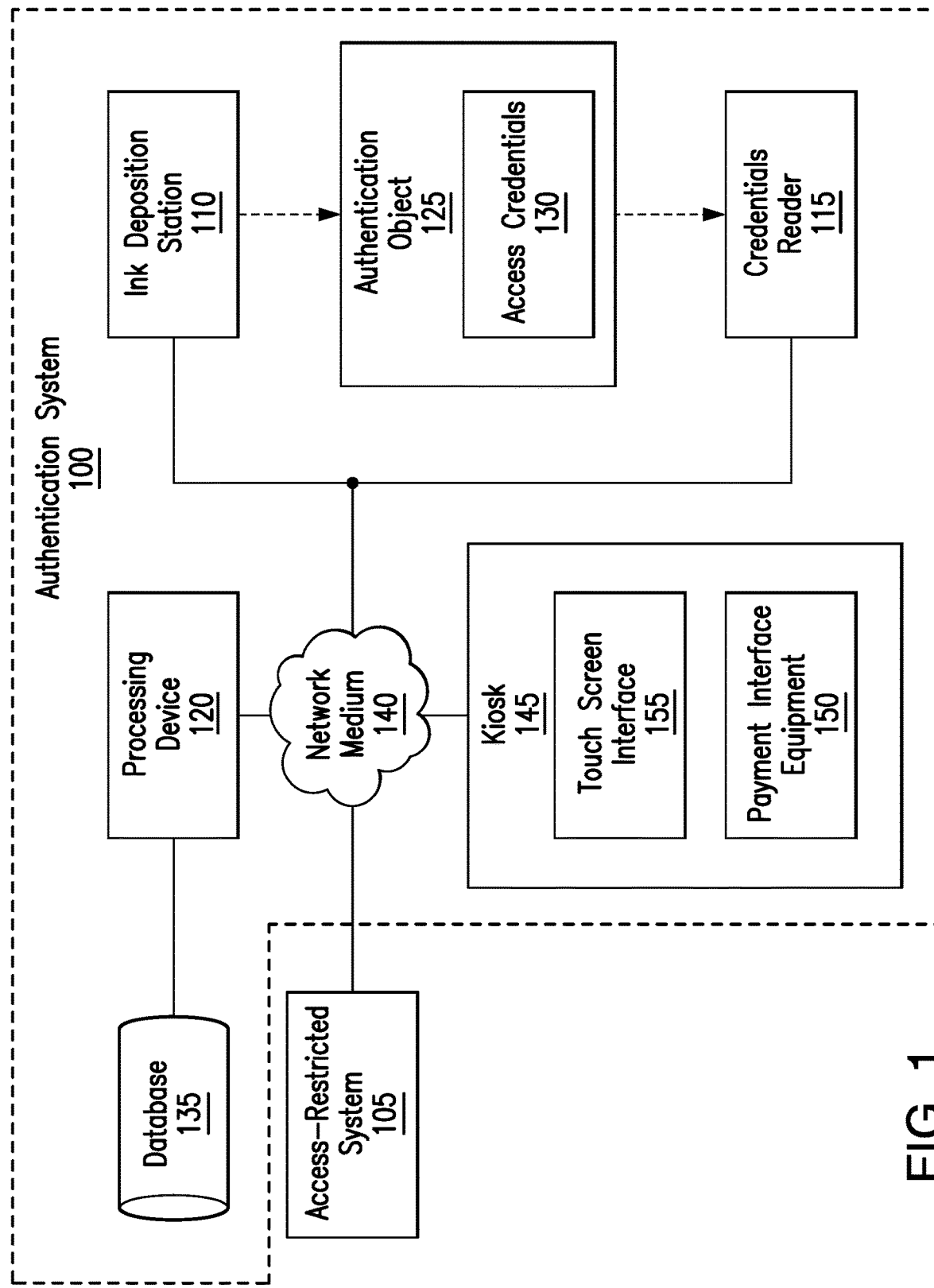
FIG. 1 is a block diagram showing connectivity among various components of an authentication system, in accordance with the present invention.

Referring now to FIG. 1, there is seen an authentication system 100 in accordance with the present invention. Authentication system 100 includes components configured to permit a user to acquire access rights and to subsequently gain access to one or more portions of an access-restricted system 105, such as, for example, an access-restricted charging station, service, venue, area, room, device, facility, computer, tablet or other computing mechanism, etc. Authentication system 100 may also be used to manage access to an electronic locker system, such as, for example, the electronic locker systems described and claimed in co-owned U.S. patent application Ser. No. 15/084,298. System 100 may also be employed to track time units associated with certain events. For example, in one embodiment, authentication system 100 is used to track time worked by employees at a work site. In other embodiments, authentication system 100 may be used to authenticate credit payments, such as, for example, at casinos and other venues. In still other embodiments, authentication system 100 may be used to track objects through a system, venue or other location.

Authentication system 100 includes a user interface panel 145 (which may take the form of a kiosk), an ink deposition station 110, and credentials reader 115 communicatively coupled to a processing device 120 (with a database 135) via network medium 140. To gain access to access-restricted system 105, a user first obtains access rights from kiosk 145. The access rights may include rights to access the entirety of access-restricted system 105 or, alternatively, may include rights to access only a portion of system 105. After the access rights are obtained, the user employs ink deposition station 110 to print access credentials 130 on an authentication object 135. The user may then interface with credentials reader 115, which reads access credentials 130 from authentication object 125 and communicates them to processing device 120. Processing device 120 then authenticates access credentials 130 and, if valid, permits the user access to those portions of access-restricted system 105 associated with the user's access rights.

As shown in FIG. 1, authentication system 100 is separate and distinct from access-restricted system 105 and, in this manner, functions as a stand-alone collection of components for managing access functions for access-restricted system 105. It should be appreciated, however, that authentication system 100 may form a part of access-restricted system 105 itself, such as, for example, with respect to an electronic locker system built to include one or more components of authentication system 100. The present invention, however, is not intended to be limited to any specific positioning or arrangement of authentication system 100 or its components with respect to access-restricted system 105.

Network medium 140 is operable to permit electronic communications among components of authentication system 100 and access-restricted system 105. Network medium 140 may include, for example, a wired Ethernet network, a wireless communication network (such as Wi-Fi or Bluetooth), direct conduit wiring, satellite, and/or any combination of these or other communication mediums. It should be appreciated, however, that embodiments of the present invention are not intended to be limited to any particular type of communication medium, and that the full scope of the invention contemplates various additional communication mediums.

Authentication object 125 acts as a "key" that allows a user to gain access to access-restricted system 105. For this purpose, authentication object 125 may include, for example, any object capable of being carried by a user and receiving printed ink or dye, such as, for example, a blank medium (such as a blank sheet of paper, card, or other similar medium), a ticket (such as a ticket to an entertainment venue or receipt therefor), a driver's license, a credit card, a wristband, etc. Authentication object 125 may also include or comprise one or more body parts of a person, such as, for example, the back of a hand or wrist of the user or other person.

Access credentials 130 printed on authentication object 125 may include, for example, any data printable on authentication object 125 that identifies a user (or group of users) authorized to access access-restricted system 105, such as, for example, an image or picture, a symbol, a barcode, a number (such as a PIN number), letters, and/or any combination of these.

Processing device 120 manages all authentication and access functions of authentication system 100. For this purpose, processing device 120 may include a general purpose computer or other off-the-shelf components executing appropriate software or, alternatively, may include special purpose hardware and/or software. In one embodiment, processing device 120 consists of a rack mounted personal computer (PC) operable to execute specially designed software for performing all authentication and access functions of authentication system 100. It will be appreciated, however, that various embodiments of the present invention are not intended to be limited to any particular processing hardware and/or software. It should also be appreciated that various embodiments of the present invention are not intended to be limited to a particular location for processing device 120. Processing device 120 may consist of a single processing device positioned at a centralized location or, alternatively, may include multiple processing devices distributed throughout authentication system 100 and/or at other locations.

Kiosk 145 includes components configured to permit a user to request (and/or purchase) access rights from processing device 120 in order to gain access to at least a portion of access-restricted system 105. For this purpose, kiosk 145 includes a touchscreen interface 155 and associated software/hardware for displaying information to and receiving inputs from a user. With respect to embodiments that require payment of a fee to gain access to access-restricted system 105, kiosk 145 also includes payment interface equipment 150 for receiving various forms of payment from the user, such as credit cards, debit cards, cash, etc. In one embodiment, payment interface equipment 150 includes a bill acceptor for accepting payment in the form of cash or other negotiable instruments, a card reader (which may include an EMV chip reader) for retrieving payment and related information from credit and debit cards, a Radio Frequency Identification Device (RFID)/Near Field Communication (NFC) reader for retrieving payment and related information from various RFID/NFC devices, such as from a transponder embedded within a wristband provided by the venue at which authentication system 100 is installed or from an NFC-enabled smartphone/tablet running, e.g., Apple Pay or Android Pay, and/or barcode reader for retrieving payment and other information from a barcode, such as, for example, a barcode imprinted on a wristband, receipt or other medium.

Figure 2:
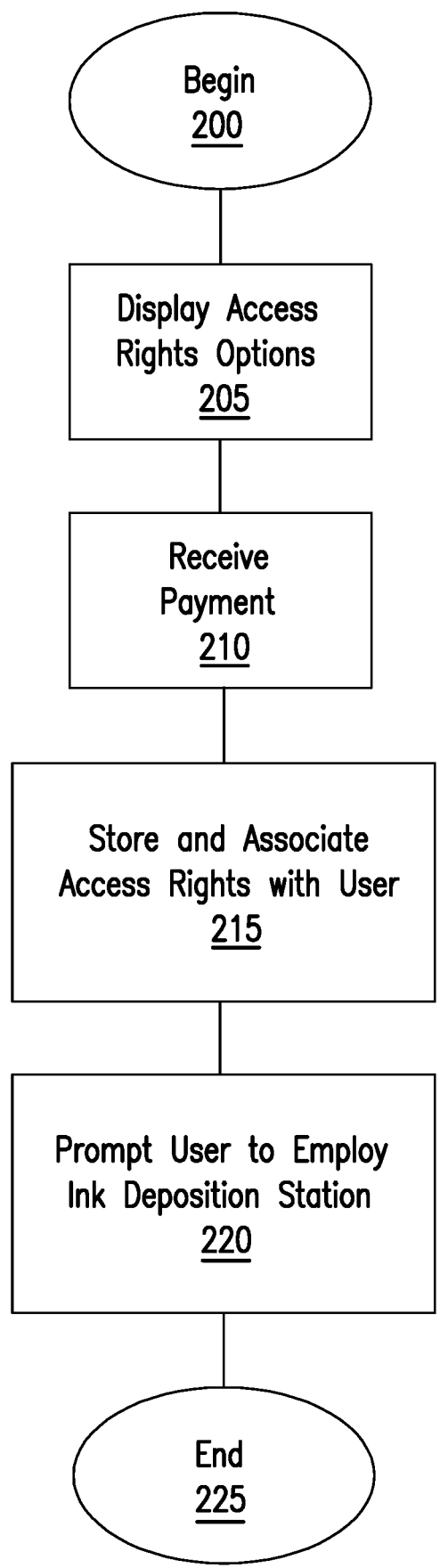
FIG. 2 is a flow chart detailing a process for requesting access rights using a kiosk, in accordance with the present invention.

Referring now to FIG. 2, there is seen a flow chart detailing a process for requesting access rights using kiosk 145. The process begins at step 200 and proceeds to step 205, at which touchscreen interface 155 of kiosk 145 displays options associated with various different access rights obtainable by the user. These options may include, for example, a duration of the access rights, portions of access-restricted system 105 available for access (such as available seats in a theatre or available lockers in an electronic locker system), number of authorized users associated with the access rights, and/or any other customizable characteristic or feature related to the access rights. To shorten the time required to select options, various embodiments of the present invention provide the user with the ability to pre-select options at an earlier time using the user's computer or other computing device. In this embodiment, authentication system 100 (or a computer server associated with and in communication with authentication system 100) is connected to the Internet, and the user is provided access to authentication system 100 via an Internet web portal. The web portal presents and allows the user to select various options associated with his/her request for access. The options selected by the user are associated with the user's access rights and assigned a barcode, which is then printed on a standard sheet of paper via a printer connected to the user's computer or saved as a barcode image on a portable Smart Device, such as a Tablet or Smartphone. The barcode on the paper or Smart Device may then be scanned at kiosk 145 via a barcode scanner (not shown) to retrieve the user's access options.

After the user selects various options associated with the access rights, the process proceeds to step 210. At step 210, the user is prompted for payment to obtain the access rights. In various embodiments, the payment required may depend on options selected by the user at step 205. For example, selecting a longer duration of the access rights or more than one user may require a larger payment. It should be appreciated, however, that various embodiments of the present invention may not require payment, and that access rights may be provided to the user free of charge.

After the user provides proper payment, the process proceeds to step 215. At step 215, processing device 120 stores data indicative of the access rights in database 135 and associates the access rights with the user (or group of users in the event of more than one authorized user, such as, for example, a group of friends or family members).

The process then proceeds to step 220, at which a message is displayed on touchscreen interface 155 directing the user to place an authentication object 125 within ink deposition station 110 for printing access credentials 130 thereon. The process then ends at step 225.

Figure 3:
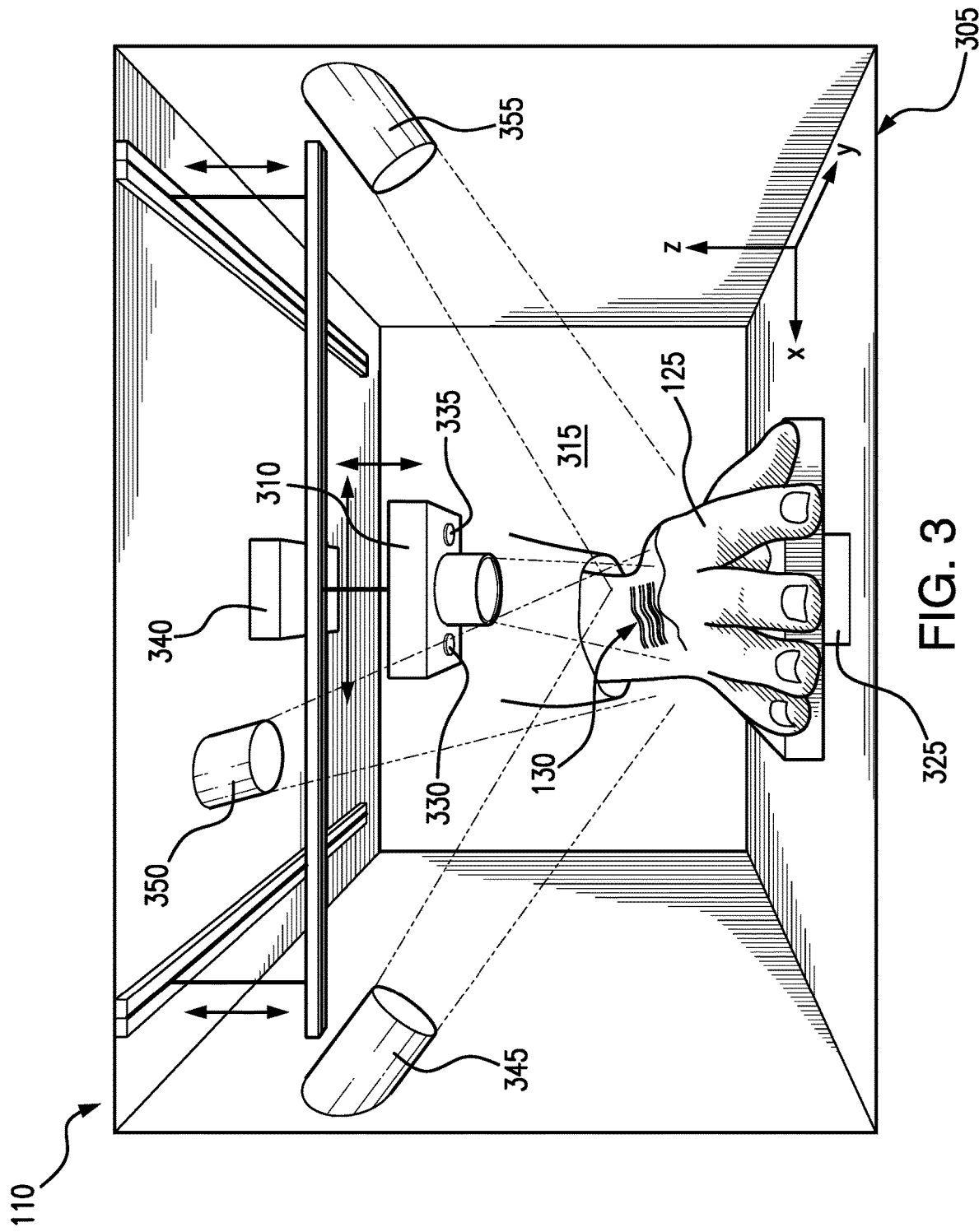
FIG. 3 is a diagram of an ink deposition station, in accordance with the present invention.

Referring now to FIG. 3, there is seen an ink deposition station 110 in accordance with the present invention. Ink deposition station 110 includes a frame 305 and a printing unit 310 within frame 305 and disposed over a printing area 315. Ink deposition station 110 also includes a platform 325 within printing area 315 for receiving authentication object 125, a camera 355 for imaging authentication object 125, a distance sensor 330 for acquiring the distance of authentication object 125 relative to printing unit 310, a motion sensor 335 to detect motion of authentication object 125, a translation mechanism 340 for moving printing unit 310 (or an ink head associated with printing unit 310) into a proper position for printing access credentials 130 on authentication object 125, a curing device 345 for curing an ink or dye printed by printing unit 310 onto authentication object 125, and an ink reader 350 for verifying access credentials 130 after printing and/or detecting previously printed access credentials 130.

Printing unit 310 is controllable by processing device 120 to print access credentials 130 on authentication object 125. For this purpose, printing unit 310 may include any type of ink printing unit 310, such as, for example, a continuous or non-continuous printing unit 310 employing a piezoelectric ink jet printing head, a thermal ink jet printing head, a dye sublimation print head, a laser print head, a phase change print head, an impact print head, etc. Printing unit 310 may also be configured to print any type of visible or invisible ink or dye medium, such as, for example, base and polymer curable ultraviolet ("UV") inks and dyes, infrared ("IR") inks and dyes, sublimation inks and dyes, water or solvent based inks and dyes, and/or magnetic inks and dyes. Such inks and dyes may be provided via ink/dye cartridges or, alternatively, may be provided via a refillable reservoir, such as a reservoir of a continuous ink supply ("CIS") system. It should be appreciated, however, that various embodiments of the present invention are not intended to be limited to any specific type of printing unit, printing head, ink or dye.

The type of ink or dye employed may depend, for example, on particular uses of authentication system 100 and access-restricted system 105. For example, with respect to applications requiring additional security, invisible inks or dyes may be employed to render it difficult for unauthorized users to observe and copy access credentials 130 to a different authentication object 125. For applications in which authentication object 125 includes a body part of a person (such as the back of a hand or wrist of a user), the ink and/or dye may also be biocompatible and/or hypoallergenic. Alternatively, where authentication object 125 includes licenses, tickets and other media intended for other uses, it may be desirable to print inks or dyes that are easily removable, such as, for example, via a hand wipe containing Isopropyl alcohol (IPA), rubbing alcohol or other solvent.

In some embodiments, printing unit 310 (or other device, such as curing device 345) is also operable to apply a pre-treatment or primer agent to authentication object 125 in order to prepare authentication object 125 to receive a particular type of ink or dye for printing access credentials 130. In other embodiments, the pre-treatment or primer is applied by the user manually, such as, for example, via a hand wipe. In still other embodiments, a dryer is employed to dry authentication object 125 before printing unit 310 deposits ink or dye thereon. Drying authentication object 125 may be desirable in situations where authentication object 125 is expected to acquire moisture throughout a rights period, such as, for example, when authentication system 100 is used to manage access rights for an electronic locker system installed at a water park.

In various embodiments, printing unit 310 is controllable by processing device 120 to print access credentials 130 using photolithography techniques. Specifically, a UV-curable ink is sprayed onto authentication object 125 and then selectively exposed to intense UV light by a scanning laser or a stencil. The laser follows a path to expose and cure only portions of the ink or dye corresponding to access credentials 130. The unexposed ink or dye is then washed away, thereby leaving behind cured access credentials 130 on the surface of authentication object 125. In an alternative embodiment, a diffuse light source is employed to expose the UV-curable ink through a masking stencil. The masking stencil, which may be positioned at a distance from authentication object 125 sufficient to ensure a well-defined print, is configured to mask areas of the ink or dye that do not correspond to access credentials 130. This leaves only cured access credentials 130 after exposure.

Translation mechanism 340 is controllable by processing device 120 for moving printing unit 310 or an associated ink head into a proper position for printing access credentials 130 on authentication object 125. Proper positioning of printing unit 310 may be desirable in some embodiments to better ensure that access credentials 130 are printed at the right location on authentication object 125 and/or to properly focus the printing of access credentials 130. In one embodiment, translation mechanism 340 includes a linear translation system capable of moving printing unit 310 into various positions along X, Y, and Z axes. In another embodiment, the linear translation system moves printing unit 310 into various positions along X and Y axes, and a separate, zooming mechanism positions printing unit 310 properly along the Z axis. In yet another embodiment, printing unit 310 is positioned on the end of an articulated-arm robot configured and operable to properly position printing head 310 in three-dimensions with respect to authentication object 125.

While FIG. 3 shows translation mechanism 340 positioned and operable to move printing unit 310, translation mechanism 340 may instead be positioned and operable to move platform 325 (with authentication object 125 thereon) into a proper position with respect to a fixed, stationary printing unit 310. In other embodiments, translation mechanism 340 may be configured to move both printing unit 310 and platform 325 to ensure proper positioning of authentication object 125 with respect to printing unit 310. Regardless, it should be appreciated that various embodiments of the present invention are not intended to be limited to any particular type of translation mechanism 340, and that the full scope of the present invention contemplates various additional ways of ensuring proper positioning of authentication object 125 with respect to printing unit 310.

Distance sensor 330 and motion sensor 335 may include any technology for determining distance and detecting motion of authentication object 125 with respect to printing unit 310. Determining distance and detecting motion of authentication object 125 may be useful in some embodiments to better ensure proper positioning of printing unit 310 and/or proper timing of ink or dye printing. Distance sensor 330 may include, for example, an optical range finder, a laser range finder, and/or an electroacoustic range finder. Motion sensor 335 may include, for example, an optical motion sensor, a passive IR motion sensor, a microwave motion sensor, an ultrasonic motion sensor, and/or a tomographic motion sensor. In one embodiment, distance and motion of authentication object 125 are determined using images captured from camera 355, thereby dispensing with the need for distance sensor 330 and/or motion sensor 335. In another embodiment, distance and motion of authentication object 125 are determined from a single integrated detecting device. It should be appreciated, however, that various embodiments of the present invention are not intended to be limited to any particular types or configurations of distance and motion sensors.

Curing device 345 includes components controllable by processing device 120 to cure an ink or dye after being deposited by printing unit 310 onto authentication object 125. With respect to embodiments employing standard water or solvent based inks or dyes, whether visible or invisible, curing device 345 may include, for example, a forced air dryer for drying the ink or dye after application. In embodiments employing a UV-curable ink or dye, such as a UV-curable polymer ink or dye, curing device 345 may include a UV light for curing the ink or dye. In other embodiments, curing device 345 is operable to apply a pre-treatment or primer agent to authentication object 125 in order to prepare authentication object 125 to receive a particular type of ink or dye for printing. In still other embodiments, curing device 345 may be configured to apply a sealer to the surface of authentication object 125 to seal the ink or dye after application, thereby providing enhanced protection and longevity of the printed access credentials 130.

Figure 4:
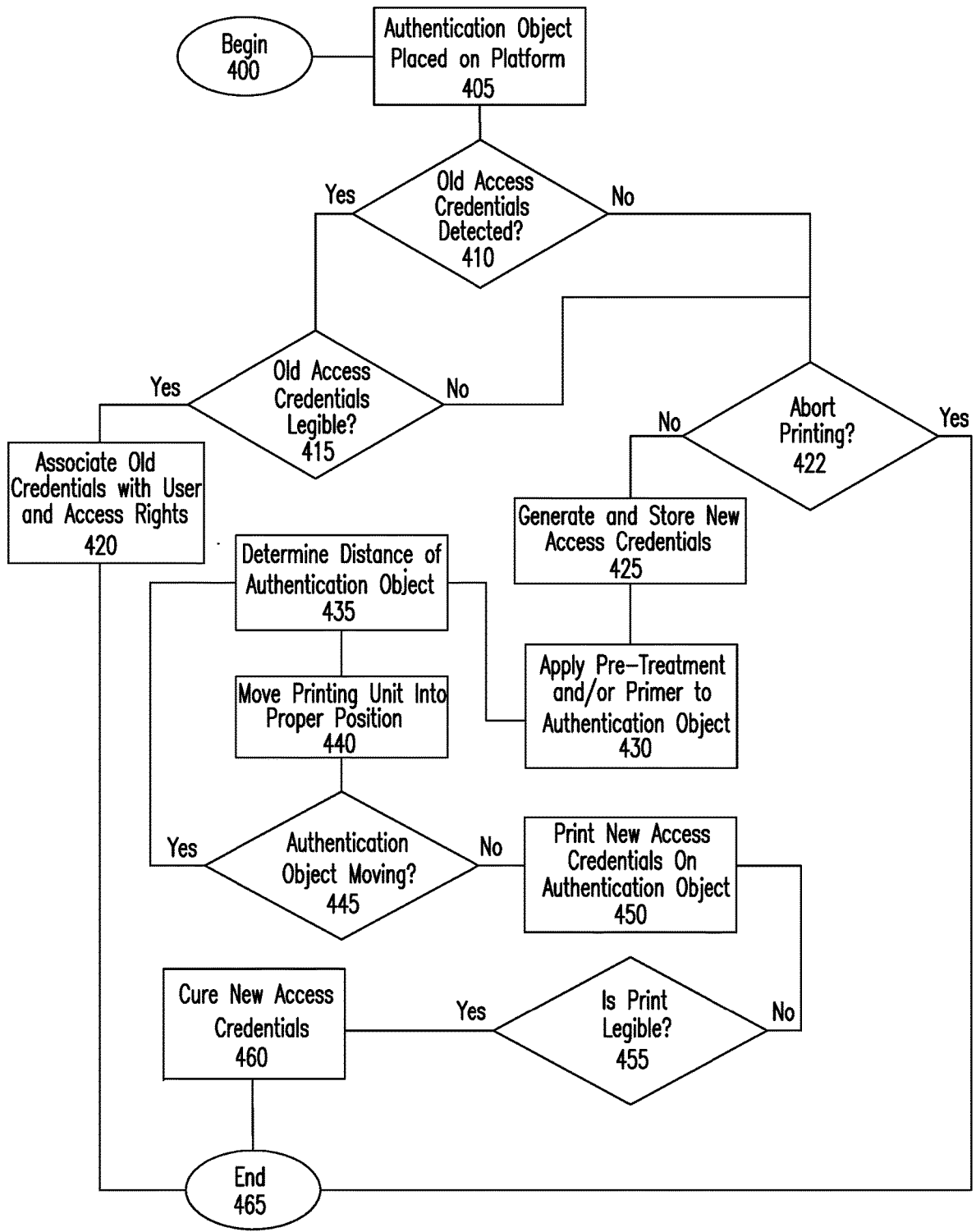
FIG. 4 is a flow chart detailing a process for printing new access credentials on an authentication object, in accordance with the present invention.

Referring now to FIG. 4, there is seen a flow chart detailing a process for printing new access credentials 130$n$ on authentication object 125 using ink deposition station 110. The process begins at step 400 and proceeds to step 405, at which the user places authentication object 125 on platform 325. Placement of authentication object 125 on platform 325 causes motion sensor 335 to trigger and communicate a motion signal to processing device 120, thereby allowing processing device 120 to determine the presence of authentication object 125. It should be appreciated, however, that presence of authentication object 125 may be determined using other methods, such as, for example, via analysis of images captured by camera 355, signals generated by distance sensor 330, and/or a combination of these or other methods.

After authentication object 125 is placed on platform 325 and detected by processing device 120, the process proceeds to step 410. At step 410, processing device 120 employs ink reader 350 to determine whether authentication object 125 already includes old access credentials 130 printed thereon, such as expired access credentials 130 or access credentials 130 associated with a different authentication system 100.

If processing device 120 detects old access credentials 130 on authentication object 125, the process proceeds to step 415. At step 415, processing device 120 determines whether old access credentials 130 are legible and suitable for use in connection with the user's current request for access. If so, the process proceeds to step 420, at which processing device 120 stores data in database 135 associating old access credentials 130 with the user and his/her access rights. The process then ends at step 465, after which the user may employ credentials reader 115 to read old access credentials 130 on authentication object 125 to gain access to at least a portion of access-restricted system 105 in accordance with his/her access rights.

If processing device 120 does not detect old access credentials 130 at step 410 or determines at step 415 that old access credentials 130 are illegible or otherwise unsuitable for use, the process proceeds to step 422. At step 422, processing device 120 checks various system parameters and/or settings to determine whether authentication system 100 should abort printing new access credentials 130$n$ and, instead, switch to an alternative method of granting and authenticating access privileges, such as, for example, via barcoded wristbands, personal identification codes, biometric scanning and/or any other alternative method. For instance, processing device 120 may check the level of ink and/or dye to be printed by ink deposition station 110 and, if too low or empty, switch to an alternative means of access. In such an embodiment, for example, a sensor positioned within an ink reservoir communicates a signal to processing device 120 when an ink and/or dye therein reaches a preset or programmable threshold. Processing device 120 may also abort printing new access credentials 130$n$ based on other system parameters, such as, for example, whether certain components of authentication system 100 are determined by processing device 120 to be defective or based on a general system error associated with authentication system 100 and/or one or more components or software modules of authentication system 100. In an alternative embodiment, processing device 120 is also operable (via suitable sensors) to abort printing new access credentials 130$n$ based on environmental variables, such as, for example, the air temperature, air moisture level, weather conditions and/or any other environmental variable. Processing device 120 may also be operable to abort printing new access credentials 130n based on a programmable system setting, thereby allowing system operators to selectively disable access credentials printing in favor of other methods of granting and authenticating access privileges.

If it is determined at step 422 that printing should be aborted, authentication system 100 switches to an alternative method of granting and authenticating access privileges, and the process ends at step 465. Otherwise, the process proceeds to step 425, at which processing device 120 generates new access credentials 130n and stores data in database 135 associating new access credentials 130n with the user and his/her access rights. In an alternative embodiment, new access credentials 130n are not generated by processing device 120, but rather are provided by the user via touchscreen interface 155 of kiosk 145. New access credentials 130n provided by the user may include, for example, a personal identification code (such as a 4-digit identification code or alphanumeric password). For security, mask characters, such as "XXXX" or "****", may hide the identification code from view upon entry.

The process then proceeds to step 430. At step 430, processing device 120 controls printing unit 310 and/or curing device 345 to apply a pre-treatment or primer agent to authentication object 125 in order to prepare authentication object 125 to receive a particular type of ink or dye for printing new access credentials 130n. It should be appreciated, however, that application of a pre-treatment and/or primer agent is not necessary and may be omitted from various embodiments of the present invention.

The process next proceeds to step 435, at which processing device 120 processes data from distance sensor 330 and/or camera 355 to determine the distance of authentication object 125 with respect to printing unit 310. The distance information is then used by processing device 120 at step 440 to control translation mechanism 340 to move printing unit 310 and/or platform 325 into a proper position for printing new access credentials 130n on authentication object 125.

After printing unit 310 and/or platform 325 is properly positioned, the process proceeds to step 445. At step 445, processing device 120 processes signals from motion sensor 335 to determine whether authentication object 125 has moved (or is moving) with respect to printing unit 310. If so, the process reverts back to steps 435 and 440 to recalculate distance of authentication object 125 and reposition printing unit 310 and/or platform 325 accordingly for printing new access credentials 130n on authentication object 125.

If the motion sensor does not detect motion of authentication object 125 at step 445, the process proceeds to step 450, at which processing device 120 controls printing unit 310 to print new access credentials 130n on authentication object 125. In the event that processing device 120 detected illegible or otherwise unsuitable old access credentials 130 at step 415, processing device 120 controls printing unit 310 to print new access credentials 130n at a location on authentication object 125 that does not overlap old access credentials 130. In this way, it can be better ensured that new access credentials 130n are legible when subsequently used to gain access to access-restricted system 105 via credentials reader 115.

After new access credentials 130n are printed on authentication object 125, the process proceeds to step 455. At this step, ink reader 350 scans new access credentials 130n on authentication object 125 to determine whether credentials 130n are legible and suitable for use in connection with the user's current request for access.

If new access credentials 130n are not legible, the process reverts back to step 450, at which ink deposition station 110 reprints new access credentials 130n on authentication object 125. In one embodiment, processing device 120 controls printing unit 310 to print new access credentials 130n at a location on authentication object 125 that does not overlap the illegible credentials 130n previously printed and/or old access credentials 130. In another embodiment, processing device 120 prints new access credentials 130n on authentication object 125 a limited number of times (defined by a preset or programmable threshold), after which authentication system 100 switches to an alternative method for associating new access credentials 130n with the user's access rights. For example, with a threshold set to "3," processing device 120 would attempt to print and verify the legibility of new access credentials 130n three times, after which authentication system 100 would switch to the use of a personal identification code (such as a 4-digit identification code or alphanumeric password). In this embodiment, touchscreen interface 155 of kiosk 145 (or some other device or screen) prompts the user to enter a 4-digit code, which may then be employed by the user to gain access to access-restricted system 105. In another embodiment, the personal identification code is generated by processing device 120 and displayed to the user via touchscreen interface 155. In still another embodiment, authentication system 100 switches to the use of barcoded wristbands or other means for granting the user access to access-restricted system 105. It should be appreciated, however, that various embodiments of the present invention are not intended to be limited to any particular alternative method for access, and that the full scope of the invention contemplates other manners and methods for granting a user alternative ways to gain access to access-restricted system 105.

If it is determined at step 455 that new access credentials 130n are legible and suitable for use, the process proceeds to step 460. At step 460, processing device 120 controls curing device 345 to cure new access credentials 130n and/or to apply a protective sealer to authentication object 125. The process then ends at step 465, after which the user may employ credentials reader 115 to read new access credentials 130n on authentication object 125 to gain access to at least a portion of access-restricted system 105.

Credentials reader 115 of authentication system 100 is operable to read access credentials 130 from authentication object 125 and communicate information indicative of credentials 130 to processing device 120 for processing. For example, with respect to embodiments employing bar-coded access credentials 130, credentials reader 115 may include a barcode reader, optical reader or other suitable reading device operable to scan and retrieve data contained within a bar code. Credentials reader 115 may also include a standard optical reader, such as a camera or other suitable device, in the event that access credentials 130 include a combination of numbers and/or letters, symbols or images. In such cases, optical character recognition and/or other techniques known in the art may be employed to extract relevant information from access credentials 130 for transmission to processing device 120.

Features of credentials reader 115 may also depend on the type of ink or dye used to print access credentials 130 on authentication object 125. For example, in the event that magnetic ink or dye is used, credentials reader 115 may include a magnetic ink reader and employ Magnetic Ink Character Recognition ("MICR") techniques to extract relevant information from access credentials 130. Or, if invisible UV and/or IR inks or dyes are used, credentials reader 115 may include UV and/or IR scanners capable of detecting such inks or dyes (or, alternatively, may include a standard camera and a UV or IR illumination source for making UV and/or IR inks or dyes visible). It should be appreciated, however, that various embodiments of the present invention are not intended to be limited to any particular type of credentials reader 115, and that the full scope of the present invention contemplates various additional methods for detecting and reading authentication credentials 130. It should also be appreciated that authentication system 100 may include a single credentials reader 115 or employ multiple credentials readers 115 positioned throughout authentication system 100 and/or at other locations. Providing multiple credentials readers 115 enhances convenience by providing users with multiple different locations to gain access to access-restricted system 105. In other embodiments, credentials reader 115 forms a component of ink deposition station 110, thereby allowing ink deposition station 110 to both print and authenticate access credentials 130. In such an embodiment, credentials reader 115 may utilize camera 355 and appropriate software (executed by processing device 120 or another device) for performing authentication functions. In still other embodiments, credentials reader 115 forms a component of a user portal, such as the user portal of various electronic locker systems described and claimed in co-owned U.S. patent application Ser. No. 15/084,298.

Figure 5:
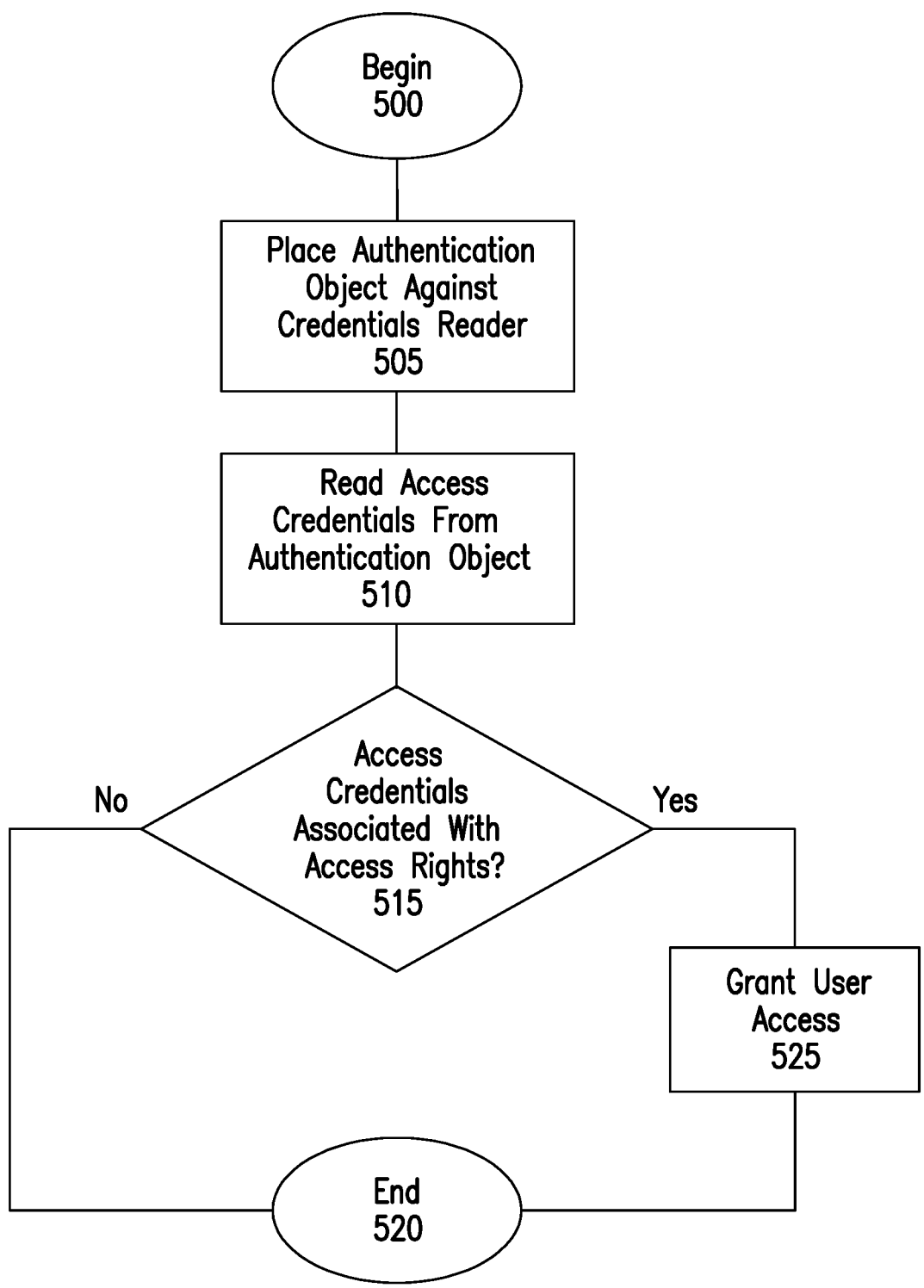
FIG. 5 is a flow chart detailing a process for using a credentials reader to gain access to an access-restricted system, in accordance with the present invention.

Referring now to FIG. 5, there is seen a flow chart detailing a process for using credentials reader 115 to gain access to access-restricted system 105 in accordance with access rights obtained by a user. The process begins at step 500 and proceeds to step 505, at which a user places authentication object 125 against credentials reader 115. At step 510, credentials reader 115 attempts to read access credentials 130 from authentication object 125. If access credentials 130 are illegible or non-existent on authentication object 125, credentials reader 115 informs the user via a screen or other communication device (not shown) and may, for example, instruct the user to contact administrative support staff to solve the issue. In another embodiment, credentials reader 115 requests the user to authenticate access credentials 130 via an alternative method, such as, for example, via the use of a personal identification code or password. Credentials reader 115 may request the alternative authentication method after the first failed scan of access credentials 130 or, alternatively, may request the alternative authentication method after a predetermined number of failed attempts to scan access credentials 130. The predetermined number of failed attempts may be a preset number or may be programmable to allow system operators flexibility to customize authentication system 100.

If credentials reader 115 successfully reads access credentials 130 at step 510, credentials reader 115 transmits data indicative of access credentials 130 to processing device 120. The process then proceeds to step 515, at which processing device 120 queries database 135 to determine whether access credentials 130 scanned by credentials reader 115 were previously associated with the user and his/her access rights (see, for example, steps 420 and 425 of the process flow chart of FIG. 4). If access credentials 130 are not associated with the user and his/her access rights, access to access-restricted system 105 is not granted and the process ends at step 520. If access credentials 130 are associated with the user and his/her access rights, the process proceeds to step 525, at which processing device 120 grants the user access to at least a portion of access-restricted system 105 in accordance with his/her access rights. The process then ends at step 520.

In an alternative embodiment, the user may gain access to access-restricted system 105 in other ways. For example, with respect to embodiments in which the user or system 100 provides access credentials 130 in the form of a PIN or password, the PIN or password may be entered manually by the user via touchscreen interface 155 of kiosk 145 (or at other locations) in order to gain access. In the event that access credentials 130 are printed using invisible UV or IR ink or dye, a separate reading station may be provided to remind the user of his/her PIN or password. The reading station may include, for example, a black light or other source of illumination that causes access credentials 130 to become visible when authentication object 125 is inserted into the reading station. The reading station may also include a shield, cover or other means of blocking the view of authentication credentials 130 from unauthorized persons standing within the vicinity of the user, thereby enhancing security of authentication system 100.

In yet another embodiment, access credentials 130 scanned from authentication object 125 may be used to identify certain individuals associated with the authentication object. For example, in the event that access credentials 130 are associated with members of the same family, venue operators may use credentials reader 115 (or a separate portable reader) to scan access credentials 130 of lost children to identify their parents. This information may then be used to locate the parents within the venue and reunite them with their lost children.

Figure 6:
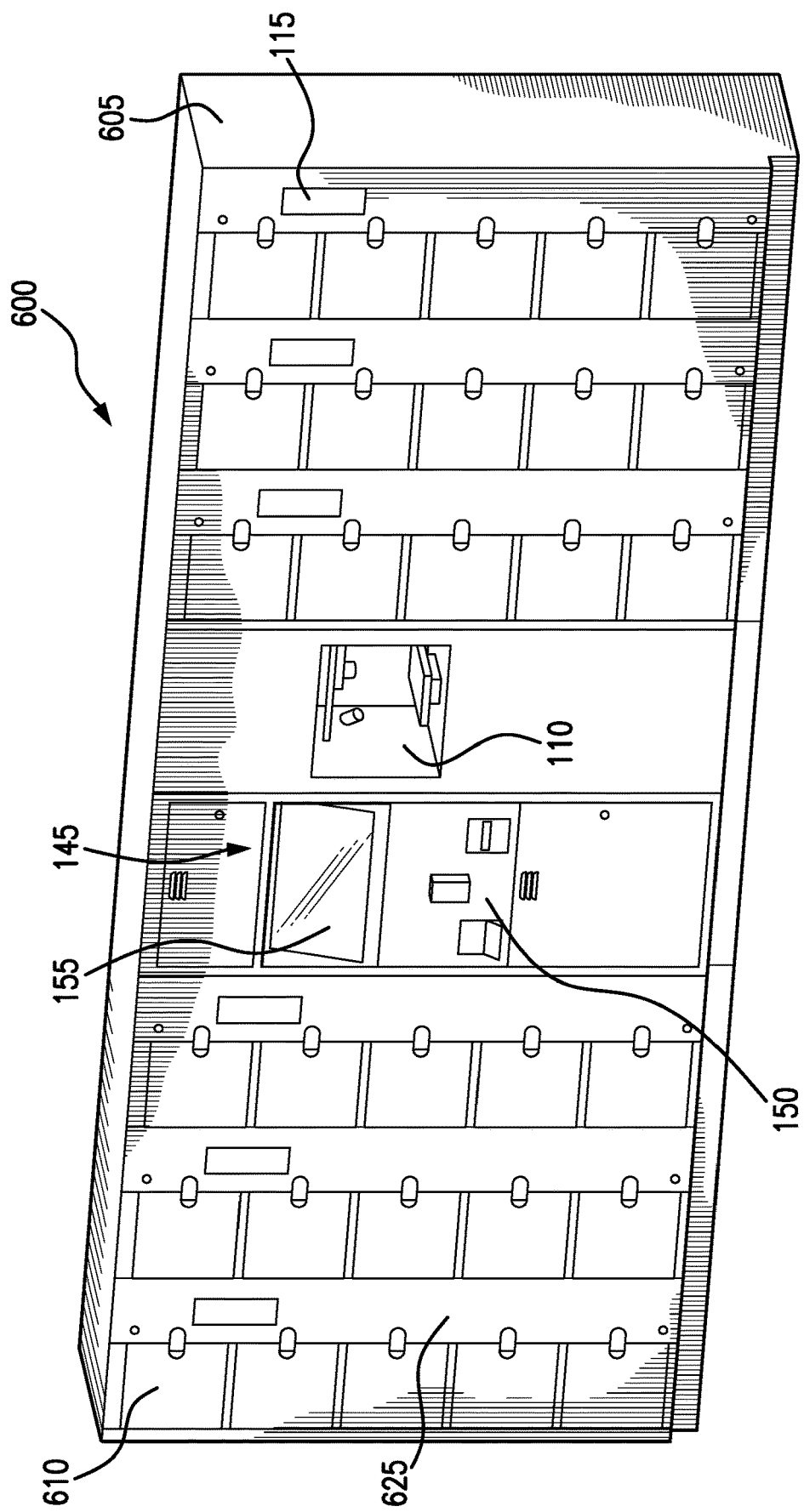
FIG. 6 is a diagram of an electronic storage system employing an authentication system, in accordance with the present invention.

Referring now to FIG. 6, there is seen an electronic storage system 600 employing an authentication system 100 in accordance with the present invention. Electronic storage system 600 includes a system housing 605, a plurality of securable units 610, such as storage compartments 610, arranged in a matrix-like configuration of multiple columns, a kiosk 145 with processing device 120 (not shown) and touchscreen interface 155 in electronic communication with storage compartments 610, ink deposition station 110 and one or more credentials readers 115 disposed on rails 625 between the columns of storage compartments 610. Electronic storage system 600 is intended for use by customers at various entertainment venues, such as amusement and water parks, ski resorts, theatres and other venues where securable storage of customer property is desired. The system achieves this by enabling a customer to rent a storage compartment 610 for storage of personal belongings using kiosk 145 and thereafter to controllably access the storage compartment 610 for a duration using credentials readers 115.

Figure 7:
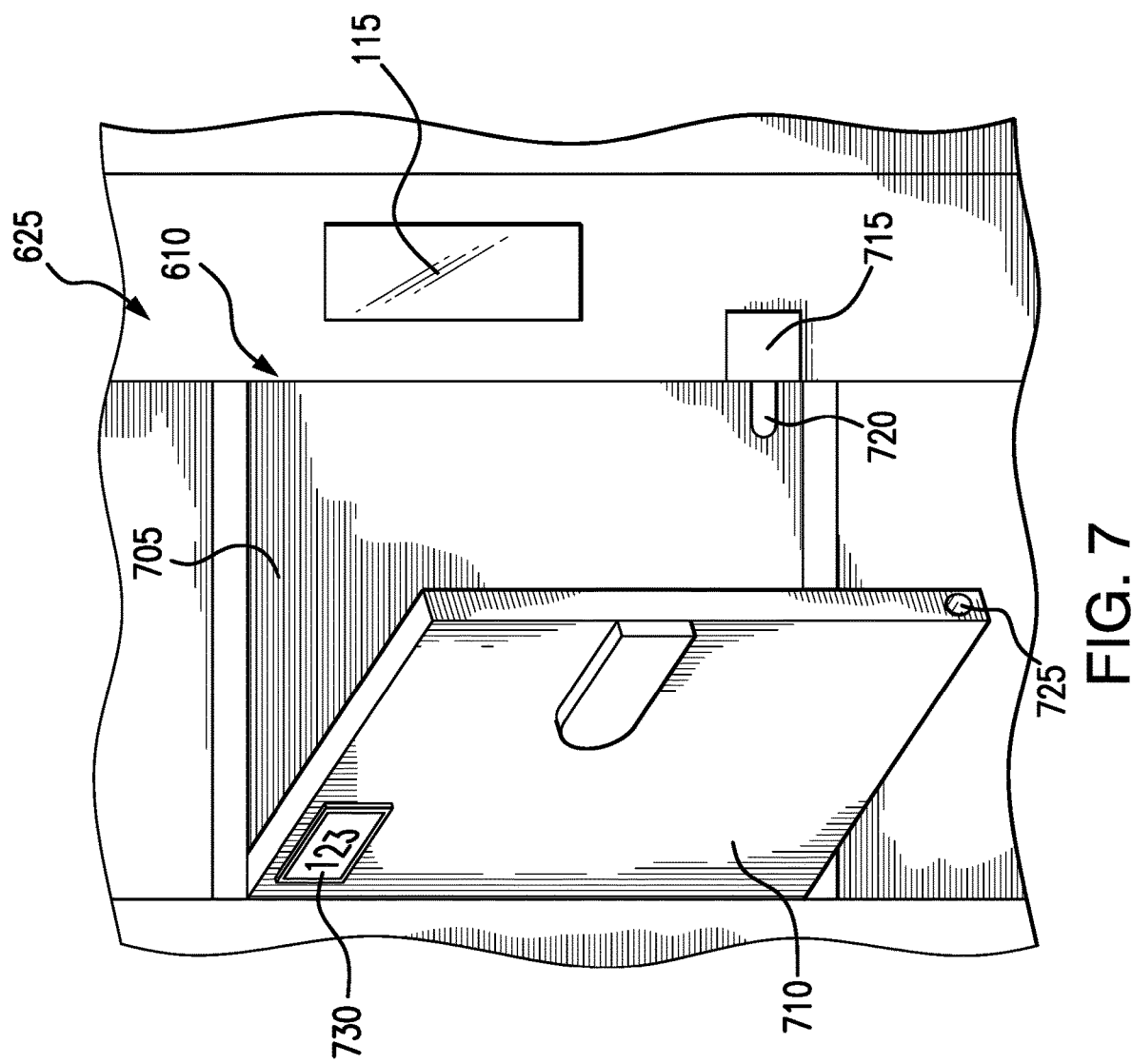
FIG. 7 is a storage compartment, in accordance with the present invention.

Referring now to FIG. 7, there is seen a storage compartment 610 according to the present invention. Various different sized storage compartments 610 (e.g., small, medium, large and extra-large) may be included within electronic storage system 600. Each compartment 610 includes a cubicle 705 for storing customer belongings, a door 710 for securing cubicle 705, a compartment identifier 730 (e.g., an ID number or other information uniquely identifying storage compartment 610) and an electronic locking mechanism 715 positioned within rail 625 alongside and adjacent to door 710 of cubicle 705 (in other embodiments, locking mechanism 715 is positioned on or within door 710). When door 710 is closed, locking mechanism 715 automatically secures cubicle 705 by engaging a pin 720 within an associated receptacle 725 of door 710 (or a receptacle within rail 625, in the event locking mechanism 715 is positioned on or within door 710), thereby securing door 710 firmly against rail 625 in a closed and secure position. When electronically controlled to unlock, locking mechanism 715 retracts pin 720 and opens door 710, thereby allowing access to cubicle 705.

Figure 8:
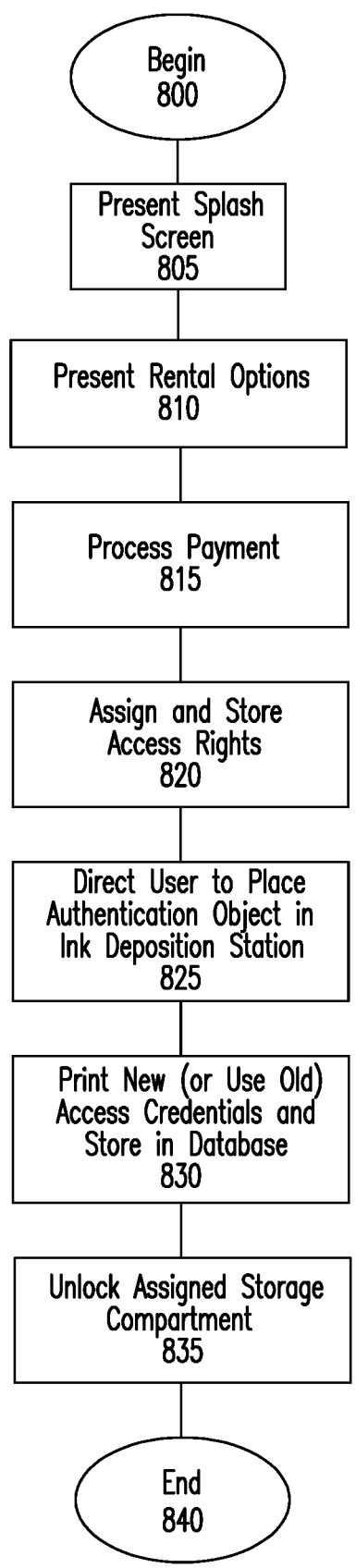
FIG. 8 is a flow chart detailing a process for renting a storage compartment a using kiosk, in accordance with the present invention.

Referring now to FIG. 8, there is seen a flow chart detailing a process for renting a storage compartment 610 using kiosk 145. The process beings at step 800 and proceeds to step 805, where a user is presented with an introductory splash screen via touchscreen interface 155 of kiosk 145. The splash screen displays various information to the user, such as information relevant to the venue at which electronic storage system 600 is installed. The splash screen, or other screen presented to the user during the rental process, may also display appropriate terms and conditions, such as when electronic storage system 600 is configured as a "ride" system operable to offer free compartment rentals for limited periods of time.

After exiting the splash screen, the process proceeds to step 810, at which the user is presented with various options associated with the rental of storage compartment 610. In one embodiment, the user is presented with a display on touchscreen interface 155 showing options permitting him/her to select a desired size (e.g., small, medium, large or extra-large) for a storage compartment 610 to be rented. Size options correlate to respective prices for available compartments, whereas options for unavailable sizes are not presented or, alternatively, are presented in a non-selectable form (e.g., greyed out) with a suitable message, such as "Sold Out." Size options provide flexibility by permitting the user to select an amount of storage commensurate with his/her needs at a particular time. For example, an individual wishing to store only one or a few items may select a small compartment, whereas a larger compartment may be selected to accommodate bulky items or belongings of multiple individuals.

In another embodiment, the user is also presented with a display showing options permitting him/her to select a desired vertical location (or height) of storage compartment 610, if available. Height options are presented in accordance with the compartment size option selected by the user (e.g., medium). In this manner, the user can ensure comfortable access of the assigned storage compartment 610 based on preferences and attributes, such as the height of the user, physical disabilities, etc. The user may also be presented with options permitting him/her to select the duration of the rental and/or to select a fixed price, to which the electronic storage system 600 assigns a rental duration. For example, in one embodiment, the user is presented with options permitting him/her to select a number of hours to rent storage compartment 610 or a multi-day rental, whereby the user can select a number of days to rent storage compartment 610.

After selecting various options associated with the rental, the process proceeds to step 815 where the user is presented with payment options for renting storage compartment 610. As described above, kiosk 145 of electronic storage system 600 is configured to accept various forms of payment, such as cash, credit cards, debit cards, and payments via RFID/NFC devices and barcodes (some embodiments may omit one or multiple forms of payment or offer locker access free of charge). In the event the user pays with a credit or debit card or RFID/NFC device, kiosk 145 processes and verifies payment over the Internet using standard processing communications with appropriate clearing houses.

After payment is verified, the process proceeds to step 820. At this step, processing device 120 of kiosk 145 assigns access rights to the user and associates these rights to an available storage compartment 610 consistent with the options selected by the user at step 810, such as size and height preferences. Processing device 120 then stores the access rights (with associated user information) in database 135.

The process then proceeds to step 825. At this step, processing device 120 causes touchscreen interface 155 to display a message to the user directing him/her to place an authentication object 125 (such as the back of the user's hand or wrist) within ink deposition station 110 for printing access credentials 130 thereon. After the user positions authentication object 125 within ink deposition station 110, the process proceeds to step 830, at which ink deposition station 110 proceeds to print access credentials 130 (or use old access credentials 130 already printed) in accordance with an ink deposition process, such as the one described with respect to the flow chart of FIG. 4. Data indicative of access credentials 130 is then stored in database 135 and associated with the access rights of the user and assigned storage compartment 610. In one embodiment, ink deposition station 110 employs an invisible ink or dye (such as a UV or IR ink or dye) to better ensure that unauthorized users cannot discover access credentials 130 from merely looking at authentication object 125.

The process then proceeds to step 835. At this step, processing device 120 of kiosk 145 unlocks and opens the assigned storage compartment 610 by controlling the associated locking mechanism 715 of the compartment and communicates compartment identifier 730 and the rental time to the user via touchscreen interface 155. This information may also be provided to the user via a receipt, which may be printed and/or emailed to the user. The process then ends at step 840.

After the rental process is completed at step 840, the user locates the assigned storage compartment 610 using compartment identifier 730 provided by kiosk 145. An indicator light (not shown) on or adjacent to door 710 of compartment 610 may provide a visual indication to aid the user in locating the assigned storage compartment 610. After the user locates and places his/her personal belongings in the assigned storage compartment 610, the compartment is secured by closing door 710, which automatically engages the associated locking mechanism 715 within rail 625. The user may then access the assigned storage compartment 610 during the rental period by using one or more credentials readers 115 to read access credentials 130 on authentication object 125.

Figure 9:
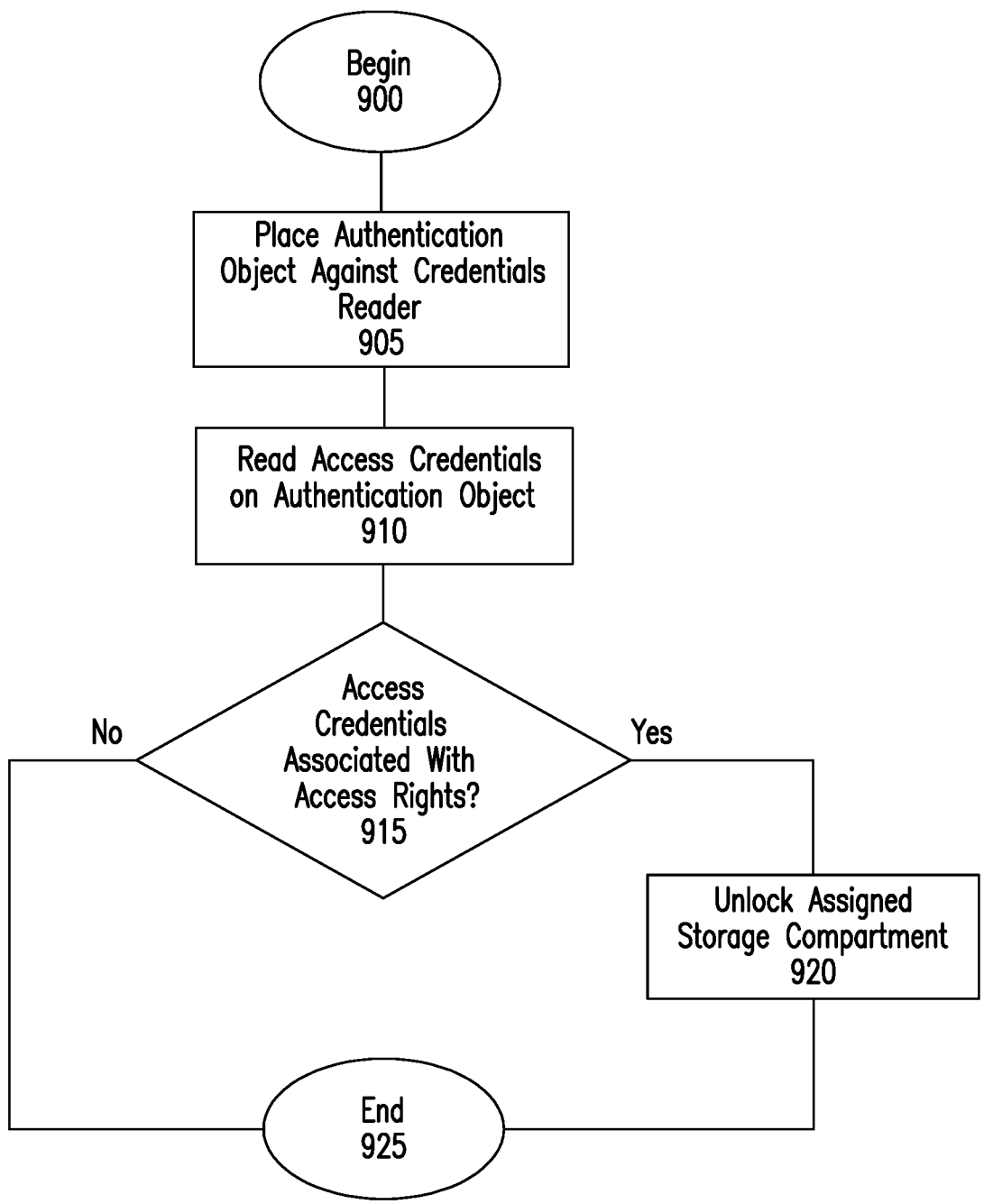
FIG. 9 is a flow chart detailing a process for accessing a rental of an assigned storage compartment, in accordance with the present invention.

Referring now to FIG. 9, there is seen a flow chart detailing a process for accessing a rental of an assigned storage compartment 610 using one or more credentials readers 115. The process beings at step 900 and proceeds to step 905, at which a user places authentication object 125 (with access credentials 130 printed thereon) against one of credentials readers 115. At step 910, the selected credentials reader 115 detects and reads access credentials 130 from authentication object 125 and transmits data indicative of access credentials 130 to processing device 120 of kiosk 145.

The process then proceeds to step 915, at which processing device 120 queries database 135 to determine whether access credentials 130 scanned by credentials reader 115 were previously associated with the user and his/her access rights (see, for example, steps 420 and 425 of the process flow chart of FIG. 4). If not, access to assigned storage compartment 610 is not granted and the process ends at step 925. In one embodiment, a suitable message, such as "Access Denied," "Invalid Code" or other suitable message, is displayed to the user via touchscreen interface 155 or other screen (not shown). If access credentials 130 are associated with the user and his/her access rights, the process proceeds to step 920, at which processing device 120 retrieves the stored compartment identifier 730 and transmits an unlock signal to the locking mechanism 715 associated with the assigned storage compartment 610, thereby causing door 710 of the assigned storage compartment 610 to unlock and open automatically to permit access thereto. In another embodiment, processing device 120 communicates information indicative of the match to a screen (not shown), which may then present the user with a message such as "success" or other suitable message informing the user that access to assigned storage compartment 610 has been granted. The process then ends at step 925.

After the access process is completed, the user locates the assigned storage compartment 610 using compartment identifier 730. An indicator light (not shown) on or adjacent to door 710 of compartment 610 may provide a visual indication to aid the user in locating the assigned storage compartment 610. After the user locates and places his/her personal belongings in the assigned storage compartment 610, the compartment is secured by closing door 710, which automatically engages the associated locking mechanism 715 within rail 625.

Figure 10:
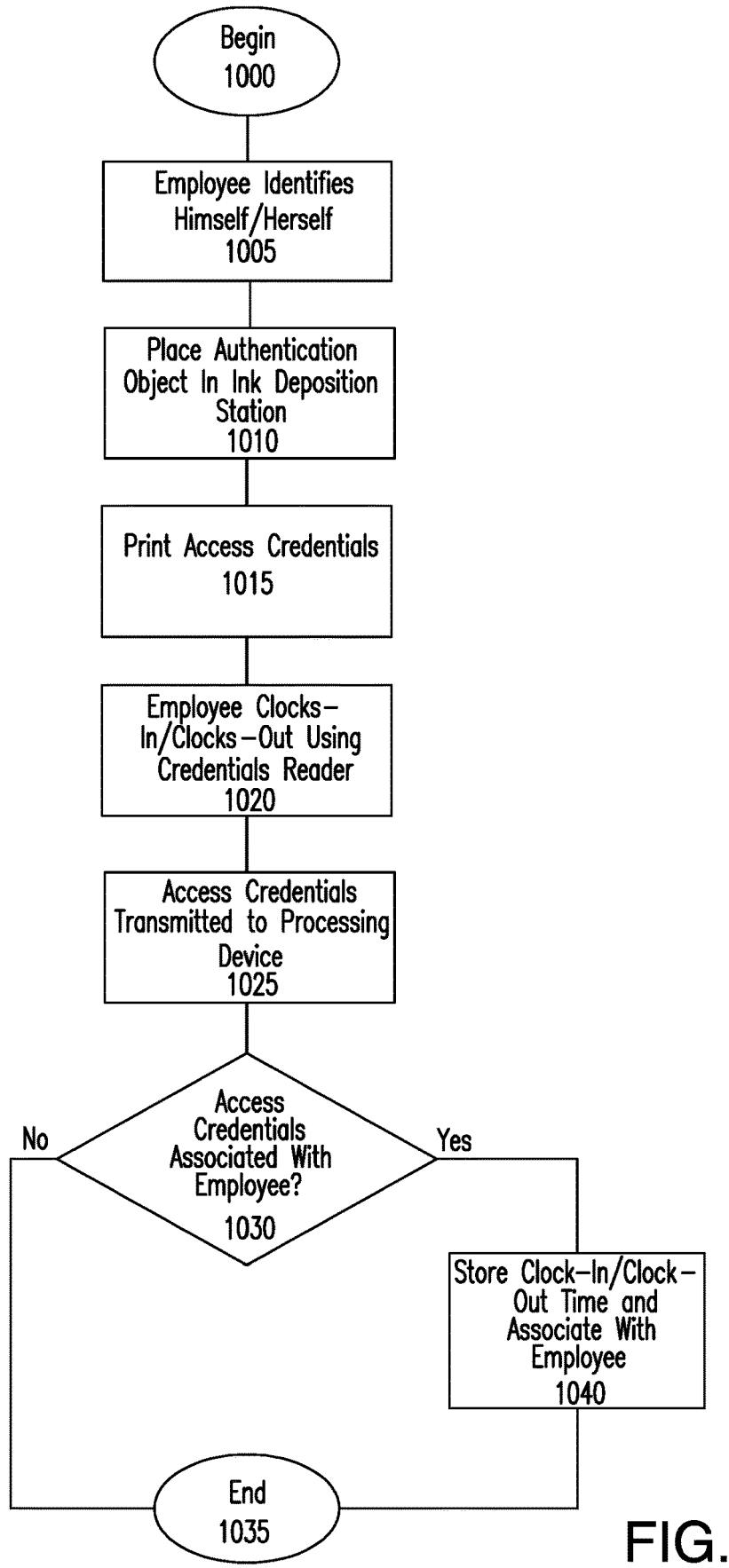
FIG. 10 is a flow chart detailing a process for using an authentication system to track time worked by employees at a work site, in accordance with the present invention.

Referring now to FIG. 10, there is seen a flow chart detailing a process for using authentication system 100 to track time worked by employees at a work site. The process begins at step 1000 and proceeds to step 1005, at which an employee at the work site uses touchscreen interface 155 to identify himself/herself using identifying credentials, such as a user name and password.

The process then proceeds to step 1010, at which the employee is directed by touchscreen interface 155 to place an authentication object 125 (such as his/her hand, a badge or other object) within ink deposition station 110.

After the employee places authentication object 125 within ink deposition station 110, the process proceeds to step 1015. At this step, ink deposition station 110 proceeds to print access credentials 130 (or use old access credentials 130 already printed) in accordance with an ink deposition process, such as the one described with respect to the flow chart of FIG. 4. Data indicative of access credentials 130 is then stored in database 135 and associated with the employee. In one embodiment, ink deposition station 110 employs an invisible ink or dye (such as a UV or IR ink or dye) to better ensure that unauthorized users (such as other employees) cannot discover access credentials 130 from merely looking at authentication object 125.

To clock-in or clock-out of the work site, the employee interfaces with credentials reader 115 at step 1020. At this step, the employee places authentication object 125 (with access credentials 130 printed thereon) against credentials reader 115. At step 1025, credentials reader 115 detects and reads access credentials 130 from authentication object 125 and transmits data indicative of access credentials 130 to processing device 120 of kiosk 145.

The process then proceeds to step 1030, at which processing device 120 queries database 135 to determine whether access credentials 130 scanned by credentials reader 115 were previously associated with the employee (see, for example, steps 420 and 425 of the process flow chart of FIG. 4). If not, processing device 120 does not record a clock-in or clock-out time or perform any other function and the process ends at step 1035. On the other hand, if access credentials 130 were associated with the employee, the process proceeds to step 1040, at which processing device 120 notes the clock-in or clock-out time and associates it with the employee in database 135. The clock-in and clock-out times may then be used by an employer to track work time of the employee.

Using authentication system 100 to track time worked by employees may be particularly beneficial, as it prevents employees from clocking in and out for other employees. Security may be enhanced even further by requiring that access credentials be printed on a body part of the employee, such as a specific hand or wrist (e.g., only a right or left hand). With respect to this embodiment, authentication system 100 may be configured to detect multiple access credentials 130 and flag an error in the event another person working at the worksite (which person's hand already includes his/her own access credentials 130) attempts to clock-in or clock-out for another employee. Security and accuracy may be further enhanced by using access credentials 130 that are indecipherable or otherwise unreadable by the user, for example, by using invisible ink to print encrypted access credentials on the employee's hand or wrist. Security may be enhanced even further by requiring different access credentials each working day, thereby eliminating the ability of the employee to provide credentials 130 to another individual for recording erroneous working hours on a subsequent working day.

In other embodiments, system 100 tracks objects through a system in a manner similar to tracking check-in and check-out times of employees at a work site. With respect to these embodiments, ink deposition station 110 prints different access credentials 130 on different objects to track, such as rentable computers, shopping carts, strollers, etc. Scanning the objects at various different locations (each with an associated credentials reader 115) allows authentication system 100 to track the different objects, for example, by noting the time and locations of the objects as they are scanned. System 100 may also correlate the different objects to various authorized users. For example, requiring an authorized user to "check-out" a particular object by scanning a badge or other identifying indicia allows system 100 to determine the identity of the authorized user and associate it with the object being tracked. The authorized user may then "check-in" the object at a later time by scanning his/her badge before returning the object. Using authentication system 100 in this manner better ensures accountability for the return of various objects rented or otherwise acquired by users on a temporary basis.

While the present invention has been illustrated by description of various embodiments and while those embodiments have been described in considerable detail, it is not the intention of applicant to restrict or in any way limit the scope of the invention to such details. Additional advantages and modifications will readily appear to those skilled in the art. The invention in its broader aspects is therefore not limited to the specific details and illustrative examples shown and described. Accordingly, departures may be made from such details without departing from the spirit or scope of the invention.

What is claimed is:

1. An authentication system for managing access to an access-restricted system, the authentication system comprising:

a user interface panel configured to receive a request for access rights from a user;

a processing device coupled to the user interface panel and configured to assign the access rights to the user;

an ink deposition station coupled to the processing device and configured to receive an authentication object from the user and to print access credentials on the authentication object in accordance with the access rights assigned to the user; and a credentials reader coupled to the processing device and configured to read the access credentials from the authentication object and transmit the access credentials to the processing device, wherein the processing device is configured to authenticate the access credentials and grant access to at least a portion of the access-restricted system in accordance with the access rights of the user, wherein the ink deposition station includes a printing head configured to print an ink or dye, a platform for receiving the authentication object, and a translation mechanism controllable by the processing device to move at least one of the printing head and the platform into a position for printing the access credentials on the authentication object.

2. The authentication system of claim 1, wherein the ink deposition station further includes a distance sensor, and the processing device determines the position for printing the access credentials in accordance with signals received from the distance sensor.

3. The authentication system of claim 2, wherein the ink deposition station includes a motion sensor, and the processing device is configured to control the ink deposition station to print the access credentials in accordance with signals received from the motion sensor.

4. The authentication system of claim 1, wherein the ink deposition station is configured to spray a pre-treatment or primer agent on the authentication object before the processing device controls the printing unit to print the access credentials on the authentication object.

5. The authentication system of claim 1, wherein the ink deposition station includes a curing device configured to cure the access credentials after the access credentials are printed on the authentication object.

6. An authentication system for managing access to an access-restricted system, the authentication system comprising:

a user interface panel configured to receive a request for access rights from a user;

a processing device coupled to the user interface panel and configured to assign the access rights to the user;

an ink deposition station coupled to the processing device and configured to receive an authentication object from the user and to print access credentials on the authentication object in accordance with the access rights assigned to the user; and a credentials reader coupled to the processing device and configured to read the access credentials from the authentication object and transmit the access credentials to the processing device, wherein the processing device is configured to authenticate the access credentials and grant access to at least a portion of the access-restricted system in accordance with the access rights of the user, wherein the processing device is configured to control the ink deposition station to print the access credentials using an invisible ink or dye.

7. The authentication system of claim 6, wherein the invisible ink or dye includes at least one of (i) an invisible UV ink or dye and (ii) an invisible IR ink or dye.

8. The authentication system of claim 7, wherein the authentication object is a body part.

9. The authentication system of claim 7, wherein the ink deposition station is controllable by the processing device to read the authentication object to detect old access credentials, and the processing device is further configured to store and associate the old access credentials with the access rights if the old access rights are detected.

10. The authentication system of claim 9, wherein the processing device is configured to control the ink deposition station to not print the access credentials if the old access credentials are detected.

11. An electronic locker system, the system comprising a housing;

a plurality of securable units within the housing; and an authentication system to manage access to the securable units, the authentication system including:

a kiosk configured to receive a request for access rights from a user for accessing an assigned securable unit;

a processing device coupled to the kiosk and configured to assign the access rights to the user;

an ink deposition station coupled to the processing device and configured to receive an authentication object from the user and to print access credentials on the authentication object in accordance with the access rights assigned to the user, the ink deposition station being further configured to print the access credentials using invisible ink or dye; and a credentials reader coupled to the processing device and configured to read the access credentials from the authentication object and transmit the access credentials to the processing device, wherein the processing device is configured to authenticate the access credentials and grant access to the assigned securable unit in accordance with the access rights of the user, wherein the ink deposition station includes a printing head configured to print an ink or dye, a platform for receiving the authentication object, and a translation mechanism controllable by the processing device to move at least one of the printing head and the platform into a position for printing the access credentials on the authentication object.

12. The authentication system of claim 11, wherein the ink deposition station further includes a distance sensor, and the processing device determines the position for printing the access credentials in accordance with signals received from the distance sensor.

13. The authentication system of claim 12, wherein the ink deposition station includes a motion sensor, and the processing device is configured to control the ink deposition station to print the access credentials in accordance with signals received from the motion sensor.

14. The authentication system of claim 11, wherein the ink deposition station is configured to spray a pre-treatment or primer on the authentication object before the processing device controls the printing unit to print the access credentials on the authentication object.

15. The authentication system of claim 11, wherein the ink deposition station includes a curing device configured to cure the access credentials after the access credentials are printed on the authentication object.

16. The authentication system of claim 11, wherein the authentication object is a body part.

17. The authentication system of claim 11, wherein the ink deposition station is controllable by the processing device to read the authentication object to detect old access credentials, and the processing device is further configured to store and associate the old access credentials with the access rights if the old access rights are detected.

* * * * *